United States Patent
Gupta et al.

(10) Patent No.: US 9,844,703 B1
(45) Date of Patent: Dec. 19, 2017

(54) PROCESS OF MAKING HOLLOW PRODUCTS, ESPECIALLY TOYS OR PET PRODUCTS, AND HOLLOW PRODUCTS MADE WITH THE PROCESS

(71) Applicants: Rishi Gupta, Secaucus, NJ (US); Daniel Troiano, Secaucus, NJ (US)

(72) Inventors: Rishi Gupta, Secaucus, NJ (US); Daniel Troiano, Secaucus, NJ (US)

( * ) Notice: Subject to any disclaimer, the term of this patent is extended or adjusted under 35 U.S.C. 154(b) by 0 days.

(21) Appl. No.: 15/084,881

(22) Filed: Mar. 30, 2016

Related U.S. Application Data

(60) Provisional application No. 62/139,915, filed on Mar. 30, 2015.

(51) Int. Cl.
| | | |
|---|---|---|
| *A63B 39/00* | (2006.01) |
| *B29C 65/48* | (2006.01) |
| *B29C 65/00* | (2006.01) |
| *B29C 45/00* | (2006.01) |
| *B29C 65/02* | (2006.01) |
| *B29K 21/00* | (2006.01) |
| *B29L 31/54* | (2006.01) |

(52) U.S. Cl.
CPC ............ *A63B 39/00* (2013.01); *B29C 66/124* (2013.01); *B29C 66/54* (2013.01); *A63B 2039/003* (2013.01); *B29C 45/0053* (2013.01); *B29C 65/02* (2013.01); *B29C 65/48* (2013.01); *B29C 2045/0077* (2013.01); *B29K 2021/003* (2013.01); *B29L 2031/54* (2013.01)

(58) Field of Classification Search
CPC . A63B 43/00; A63B 2043/001; A63B 43/002; A63B 43/06; A63B 39/06; A63B 39/00; A63B 45/00; A63B 2039/003; B29C 66/54; B29C 66/124; B29C 65/02; B29C 65/48; B29C 45/0053; B29C 2045/0077; B29K 2021/003; B29L 2031/54; D06F 1/12

See application file for complete search history.

(56) References Cited

U.S. PATENT DOCUMENTS

| | | | | |
|---|---|---|---|---|
| 495,863 | A * | 4/1893 | Whitzel ................. | A63B 43/00 446/195 |
| 2,351,762 | A * | 6/1944 | Hoover ................... | A63B 43/00 446/269 |
| 2,645,486 | A * | 7/1953 | Monahan ................. | A63F 1/02 273/294 |

(Continued)

*Primary Examiner* — Steven Wong
(74) *Attorney, Agent, or Firm* — Thomas A. O'Rourke; Bodner & O'Rourke

(57) ABSTRACT

In the process of making a hollow product, especially a deformable toy ball, two halves made from an elastomeric material, a thermoplastic material, rubber, a blend of rubbers, or a thermoplastic elastomer are formed by injection molding with mating edges that engage with each other when the halves are assembled to form the product. The edge of one of the two halves is advantageously formed with a recess centered in the edge, in which a flange formed on the edge of the other of the two halves engages to provide a form-fitting connection between the two halves. The opposing edges are then bonded with each other by fusion or melting or by an adhesive applied to at least one of the edges prior to assembling the halves together. A deformable ball produced by the process is also described.

5 Claims, 10 Drawing Sheets

(56) References Cited

U.S. PATENT DOCUMENTS

| | | | | |
|---|---|---|---|---|
| 3,095,261 A * | 6/1963 | Meyer | B29C 39/00 | 264/263 |
| 3,144,710 A * | 8/1964 | Camps-Campins | B23K 20/129 | 228/114.5 |
| 3,536,368 A * | 10/1970 | Campbell | F16C 33/32 | 29/898.069 |
| 3,599,307 A * | 8/1971 | Campbell | F16C 33/32 | 29/463 |
| 3,804,411 A * | 4/1974 | Hendry | A63B 43/06 | 273/DIG. 24 |
| 4,212,460 A * | 7/1980 | Kraft | A63B 65/00 | 273/127 A |
| 4,532,722 A * | 8/1985 | Sax | D06F 58/203 | 206/0.5 |
| D287,988 S * | 1/1987 | Billinghurst | D21/468 | |
| 4,653,758 A * | 3/1987 | Solheim | A63B 37/0003 | 264/239 |
| 4,874,169 A * | 10/1989 | Litchfield | A63B 37/14 | 473/613 |
| 4,991,847 A * | 2/1991 | Rudell | A63F 9/00 | 273/138.1 |
| 5,280,906 A * | 1/1994 | Vitale | A63B 43/00 | 273/DIG. 20 |
| 5,445,375 A * | 8/1995 | Sweeny | A63B 43/00 | 273/146 |
| 6,073,581 A * | 6/2000 | Wang | A01K 15/025 | 119/51.01 |
| 6,098,571 A * | 8/2000 | Axelrod | A01K 5/0114 | 119/707 |
| 6,174,577 B1 * | 1/2001 | Vitorino | D06F 58/203 | 428/36.5 |
| 6,207,095 B1 * | 3/2001 | Gosetti | B29C 43/146 | 264/250 |
| 6,742,683 B1 * | 6/2004 | Phan | D06F 95/008 | 223/84 |
| D511,029 S * | 10/2005 | Willinger | D21/713 | |
| D524,500 S * | 7/2006 | Wai | D06F 95/008 D32/35 | |
| D539,367 S * | 3/2007 | Jones | D21/713 | |
| 7,367,283 B2 * | 5/2008 | Aboujaoude | A01K 15/025 | 119/702 |
| 7,647,795 B2 * | 1/2010 | Kitaya | D06F 95/008 | 68/235 R |
| 8,168,026 B1 * | 5/2012 | Brown | A63B 37/06 | 156/145 |
| 8,727,918 B1 * | 5/2014 | Gentile | A63B 43/06 | 473/570 |
| 9,597,565 B2 * | 3/2017 | Forutanpour | A63B 59/00 | |
| 2006/0079355 A1 * | 4/2006 | May | A63B 43/00 | 473/594 |
| 2009/0137350 A1 * | 5/2009 | Lenig | A63B 39/00 | 473/451 |
| 2010/0243686 A1 * | 9/2010 | Zhang | D06F 95/006 | 223/84 |
| 2011/0003655 A1 * | 1/2011 | Chernick | A63B 39/00 | 473/594 |
| 2013/0098120 A1 * | 4/2013 | Lander | D06F 95/008 | 68/235 R |
| 2016/0144243 A1 * | 5/2016 | Jahnigen | A63B 37/12 | 473/600 |
| 2016/0273738 A1 * | 9/2016 | Wolfinbarger | F21V 15/01 | |

\* cited by examiner

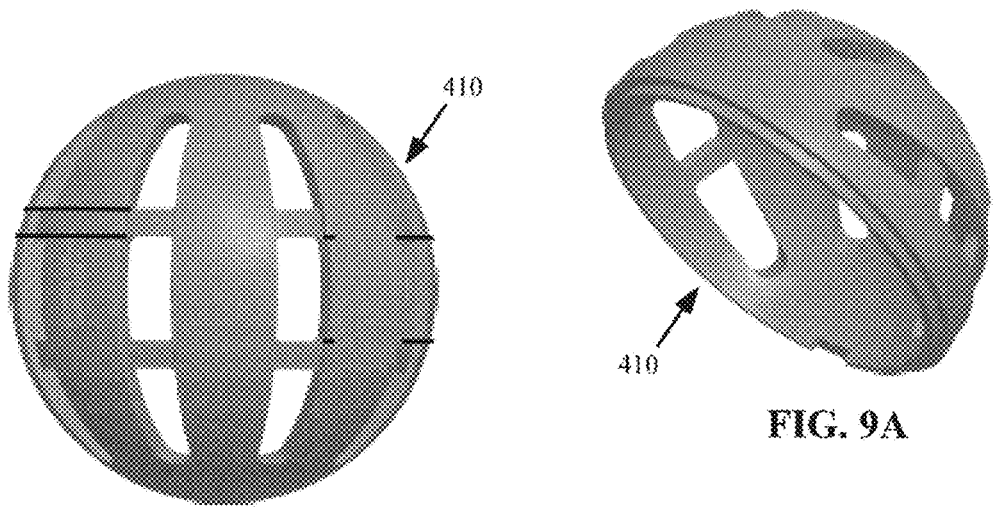
FIG. 9A
FIG. 9C
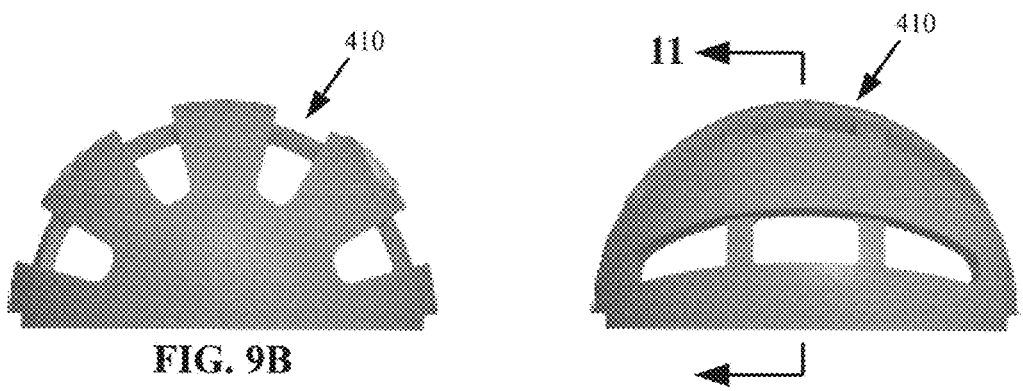
FIG. 9B
FIG. 9E
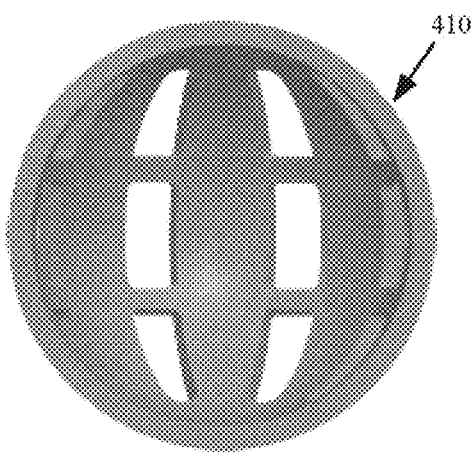
FIG. 9D

FIG. 11
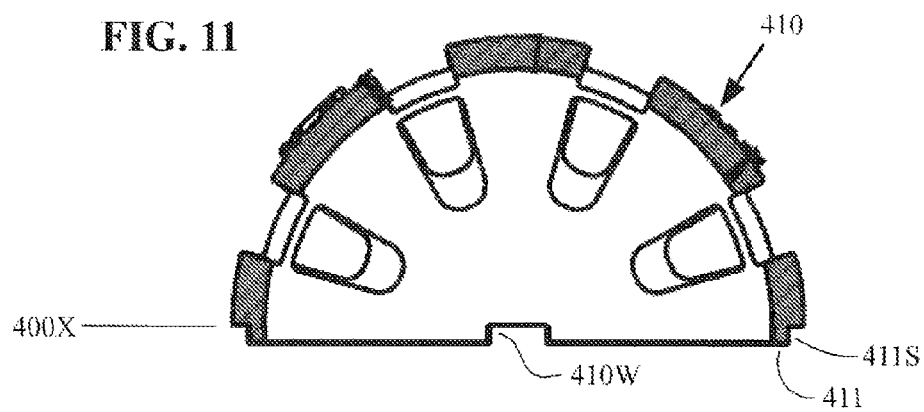
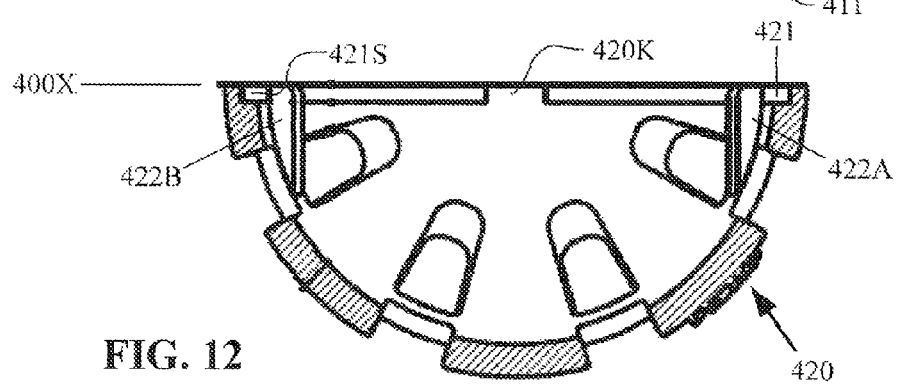
FIG. 12
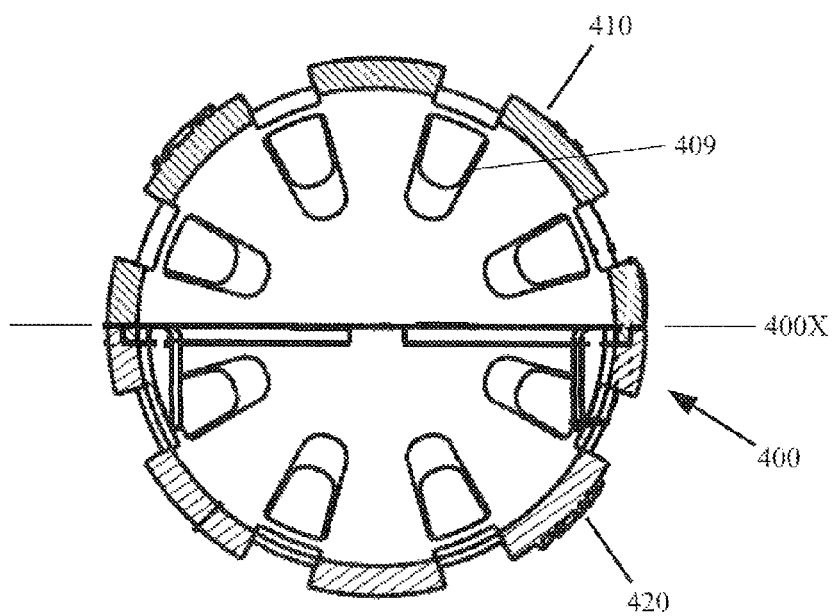
FIG. 13

PROCESS OF MAKING HOLLOW PRODUCTS, ESPECIALLY TOYS OR PET PRODUCTS, AND HOLLOW PRODUCTS MADE WITH THE PROCESS

CROSS REFERENCE TO RELATED APPLICATIONS

This application claims priority on U.S. Provisional Application Ser. No. 62/139,915, filed on Mar. 30, 2015, the disclosures of which are incorporated herein by reference.

BACKGROUND OF THE INVENTION

The present invention relates to a method or process of making hollow products, especially toys for children or pets, from an elastomeric material, a thermoplastic material, rubber, a blend of rubbers, or a thermoplastic elastomeric material (TPE) and to articles made by the aforesaid method or process. It also relates to the hollow products made by the process or the method, particularly to a deformable ball toy for a child or a pet.

SUMMARY OF THE INVENTION

It is an object of the present invention to provide an improved process or method of making a hollow product from two halves, which is made of an elastomeric material, a thermoplastic material, rubber, blends of rubbers, or a thermoplastic elastomeric material (TPE), by a molding technique.

It is a further object of the present invention to provide an improved process or method of making a toy or the like from two or more molded rubber or thermoplastic elastomeric member. The members may be halves of the overall product or may be parts thereof. According to the present invention a strong bond between the members, halves or parts is provided to secure the two members together.

It is another object of the invention to provide a process of making an improved more durable toy for a child or a pet, e.g., a cat or dog, such as a resilient ball or other shaped object, which is made by bonding the mating edges of the two halves or parts together by fusing or melting or by bonding the mating edges of the halves or parts to each other by fusing the parts or with an adhesive material to secure the two halves together.

It is an additional object of the invention to provide a durable toy for a child or a pet, especially a deformable ball or other type toy, which is made from two molded parts or halves that are securely attached, bonded or fused together with each other at mating edges of the halves or parts.

According to the present invention the process of making a hollow product, particularly a toy for children or pets, comprising two parts or halves that are secured to each other at opposing edges thereof, comprises the steps of:

a) molding respective halves of the hollow product with mating edges formed for engagement with each other when the respective parts are assembled together with the edges in an opposing relationship in order to make the hollow product;

b) after step a), bonding the mating edges of the respective halves so that the respective halves are bonded together or attached to each other to securely form the hollow product; wherein the respective halves are made of an elastomeric material, thermoplastic material, rubber, a blend of rubbers, or a thermoplastic elastomeric material (IPE).

The mating or opposing edges of the respective halves or parts are advantageously shaped for a form-fitting or form-locking engagement with each other, in order to provide a strong or secure bond between the respective parts or halves. Particularly the edge of one half is provided with a recess centered therein, in which a flange or protrusion extending from the edge of the other half engages to provide a form-fitting or form-locking connection between the halves or parts.

In some embodiments an adhesive is placed along the edge of at least one of the two halves and the two halves are bonded to each other by pressing and/or holding the edges of the two halves together, so that the respective mating edges are connected in a form-fitting engagement with each other. In alternative embodiments the mating edges of the two halves are melted or fused with each other to make a secure connection between the halves.

The term "half" used herein is not limited to a shape that is physically one-half of a completed object but can be a first member to be joined and a second member to be joined to form a hollow object.

The term 'edge' means a three-dimensional part or section of one of the halves, where that half begins or ends. It does not mean a line at which two surfaces meet. In the case of a hollow object consisting of a ball, the term edge of one of the two halves from which the ball is assembled would mean the rim of that hemispherical half.

In the case of various embodiments of the process for making a hollow product the halves can be approximately hemispherical or the halves can take other shapes that have respective mating edges that can be secured together by fusing or adhesives after being connected with each other in a form-fitting engagement.

The hollow product can be a hollow ball formed by joining the peripheral mating edges of the hemispherical parts or halves, either by fusion or by means of an adhesive material applied to one or both of the edges. The hollow product can be virtually any shape and it not limited to balls.

The hollow product made by the process may be a deformable ball comprising two hemispherical halves provided with respective mating edges. The edge of one of the halves is advantageously provided with a recess and the edge of the other of the two halves is provided with a flange or protrusion shaped to fit in the recess so as to provide a form-fitting or form-locking connection between the hemispherical halves. In order to provide a toy ball that is easily compressed or deform the halves may be molded a plurality of openings uniformly spaced around the ball circumference. When a large number of openings are provided in the body of the ball, they may be arranged in groups of two or three or more in a longitudinal direction between the poles or opposite sides of the ball.

The process of making the hollow product according to the invention will now be illustrated by a particular embodiment of a method or process in which a toy ball is made from an elastomeric material, thermoplastic material, rubber, a blend of rubber, or a thermoplastic elastomeric material.

BRIEF DESCRIPTION OF THE DRAWINGS

The objects, features and advantages of the invention will now be illustrated in more detail with the aid of the following description of a preferred process of manufacturing a hollow molded product of the invention, which is a deformable toy ball, with reference to the accompanying figures in which.

FIG. 9A is a perspective view of a first ball half for yet another embodiment of a molded boll assembly of the present invention;

FIG. 9B is a front view of the ball half of FIG. 9A;

FIG. 9C is a top view of the ball half of FIG. 9A;

FIG. 9D is a bottom view of the ball half of FIG. 9A;

FIG. 9E is a side view of the ball half of FIG. 9A;

FIG. 11 is a section cut through the first ball half shown in the side view of FIG. 9E, and further illustrates a keyway at a polar location;

FIG. 12 is a section cut through the second ball half shown in the side view of FIG. 10B, and further illustrates a key at a polar location;

FIG. 13 is a section cut showing the first ball half of FIG. 11 and the second ball half of FIG. 12 after being mated.

DETAILED DESCRIPTION OF THE INVENTION

As used throughout this specification, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A, B, and C", and "A, B, and/or C" means all of the following possible combinations: A alone; or B alone; or C alone; or A and B together; or A and C together; or B and C together; or A, B and C together.

Furthermore, the described features, advantages, and characteristics of any particular embodiment disclosed in the following specification, may be combined in any suitable manner with any of the other embodiments disclosed herein.

Figure 1:
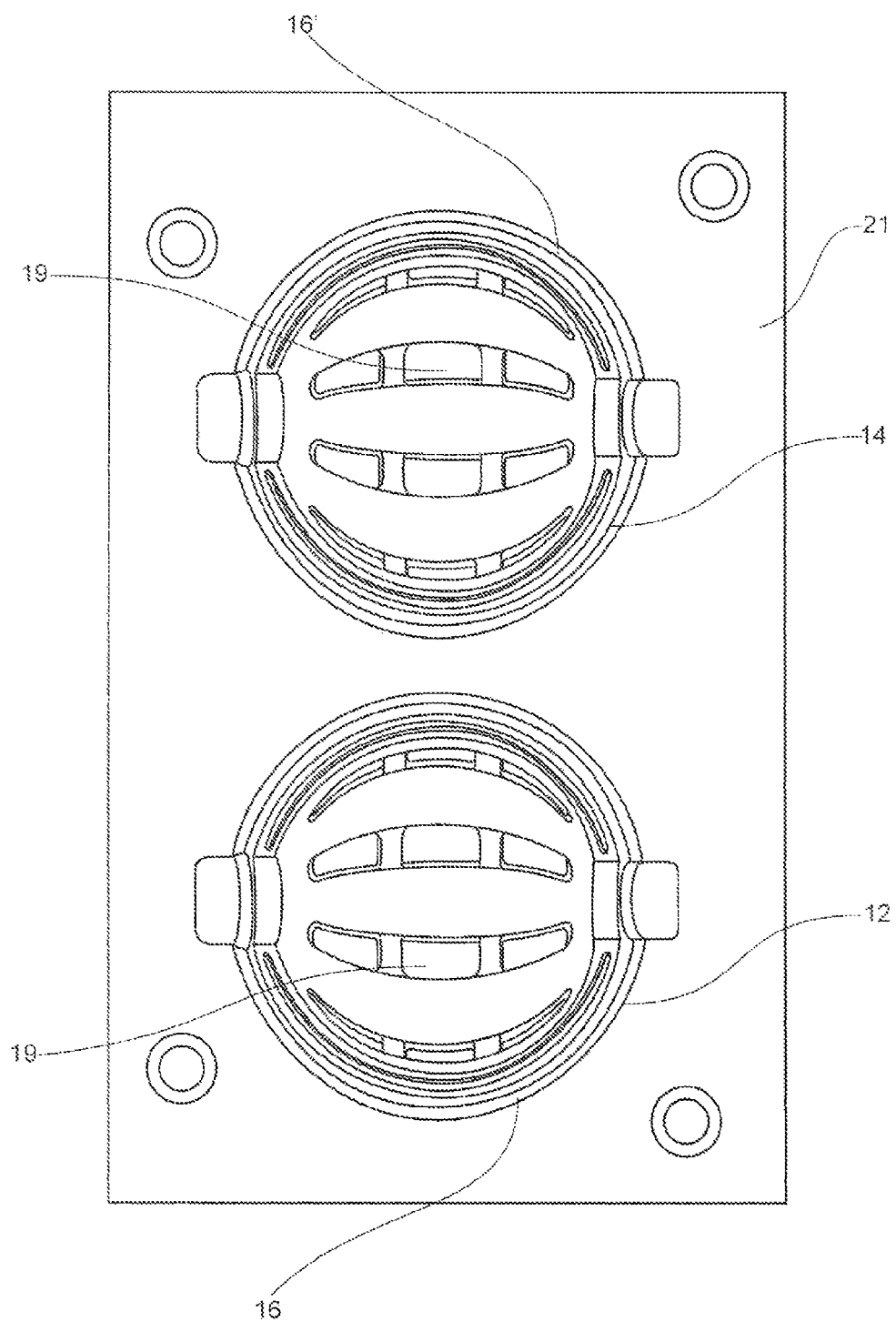
FIG. 1 is a plan view of two halves of the ball in a mole part after formation of the two halves by a molding technique.
Figure 2:
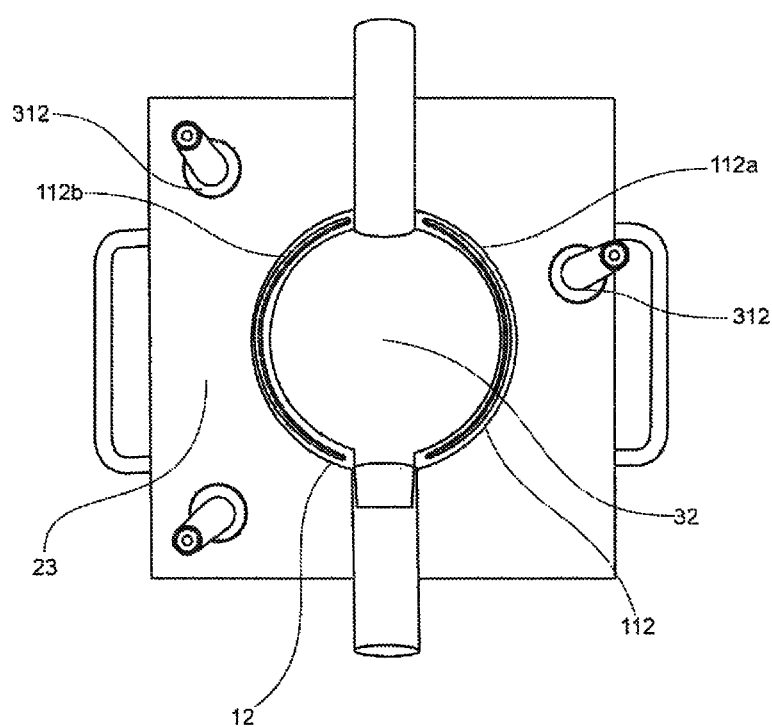
FIG. 2 is a perspective view of one of the two halves of FIG. 1 shown in a guide plate with a metal or ceramic core positioned in it.
Figure 3:
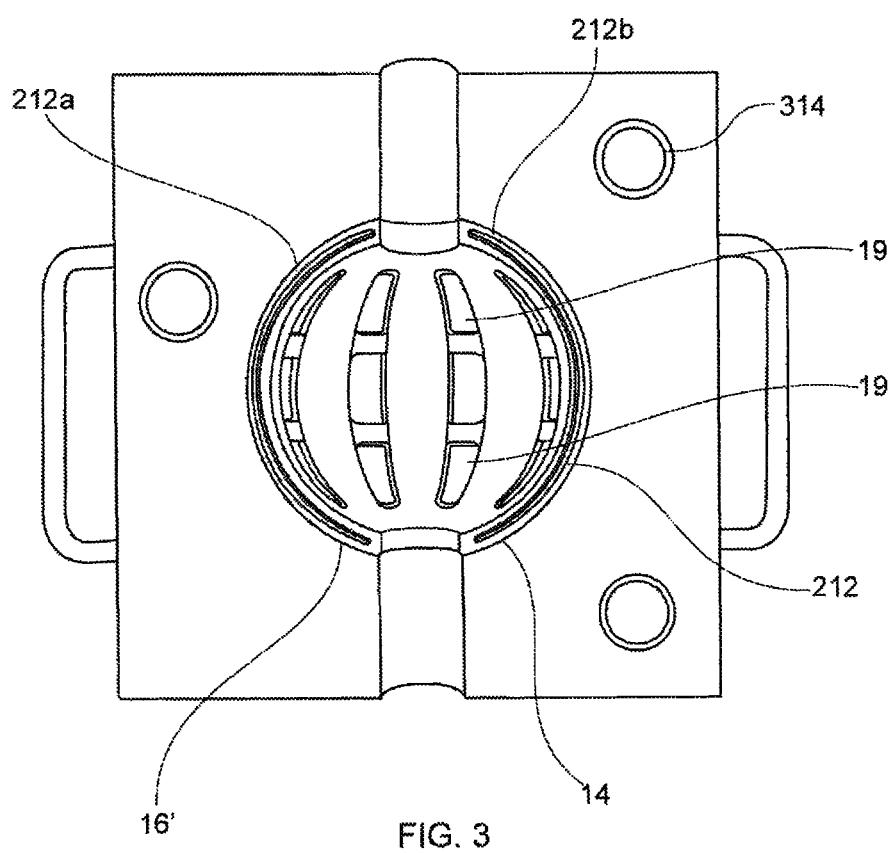
FIG. 3 is a perspective view of the other half in another guide plate before it is positioned over the half shown in FIG. 2, so that it can be joined to the first half by adhesive means or by fusion.
Figure 4:
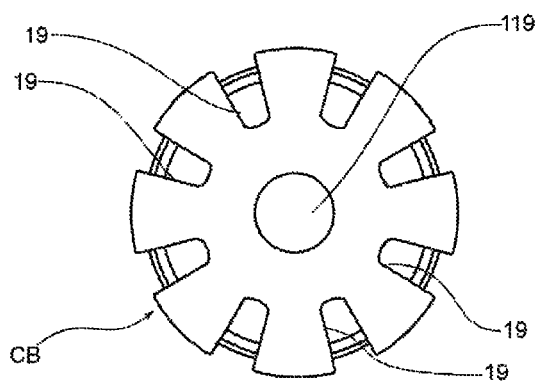
FIG. 4 is a plan view of one embodiment of a deformable ball made by the process according to the invention, which is provided with openings and polar holes in the body of the ball.
Figure 5:
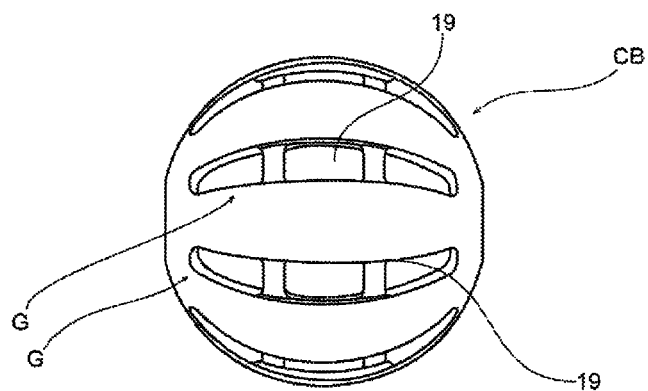
FIG. 5 is a side view of the embodiment of the ball shown in FIG. 4.
Figure 6:
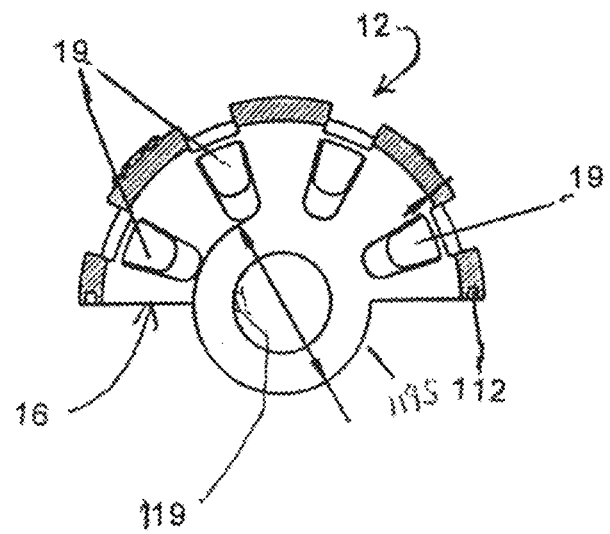
FIG. 6 is a cross-sectional view showing the interior of one of the two halves of the ball prior to assembly, and showing the recess for a form-fitting connection with the other half of the ball.
Figure 7:
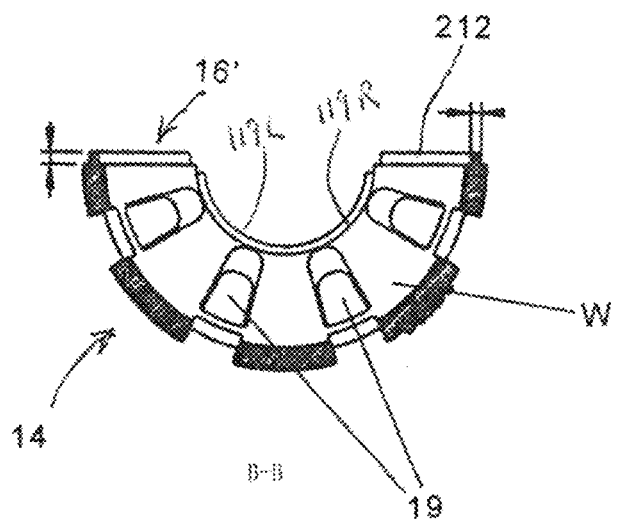
FIG. 7 is a cross-sectional view showing the interior of the other of the two halves of the ball prior to assembly, and showing the flange that engages in the recess, of the half shown in FIG. 6.
Figure 8:
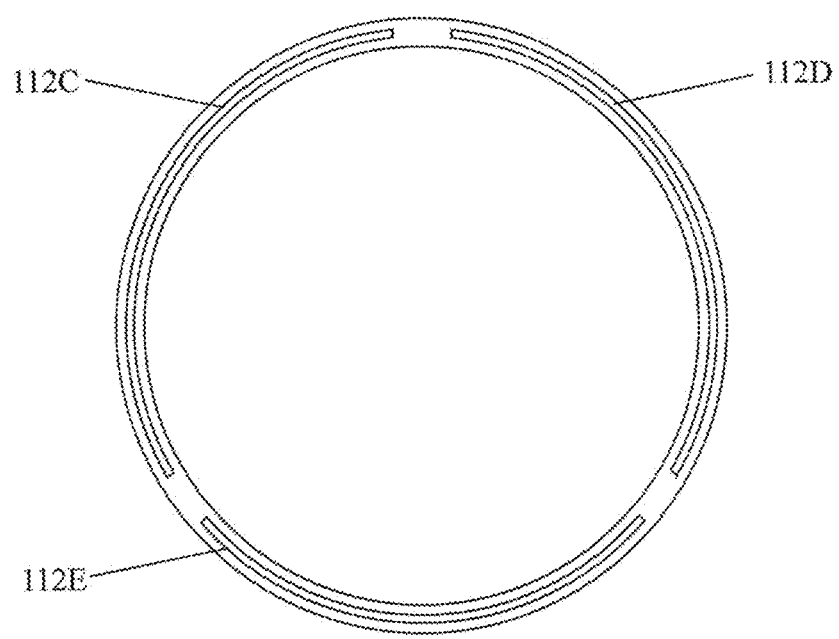
FIG. 8 is shows a ball half having the recess broken into three pads.

In a first step of one embodiment of the process for making a hello ball 10 or other hollow v product according to the invention, two members in this case, halves 12, 14 of the ball CB are formed or molded by e.g., an injection molding technique. FIG. 1 shows the two halves 12, 14 of the ball CB, which are approximately hemispherical in shape, in a mold part 21 after being formed by injection molding. Each half 12, 14 has an outer peripheral edge 16, 16' (see FIGS. 6 and 7). The edge 16 of one 12 of the two halves is provided with one or more recesses 112 that is preferably centered in the edge (as shown in FIGS. 2 and 6), which engages with a mating, flange or protrusion 212 that extends from the edge 16 of the other half 14 (as shown in FIGS. 3 and 7) when the halves 12, 14 are assembled to form the ball CB. The recess 112 extends circumferentially around the generally hemispherical half 12, but may be broken into segments 112a, 112b (FIG. 2) that only extend part way (about half way) around the circumference of the half 12, in which corresponding sections 212a, 212b of the flange or protrusion 212 engage in a form-fitting connection. In another example, shown in FIG. 8, there may be a three-part recess that may include recess 112C, recess 112D, and recess 112E.

FIG. 2 shows a metal core 32 positioned in one 12 of the two halves 12, 14 with its edge 16 provided with recess 112 exposed on one side of a guide plate 23. The approximately hemispheric half 12 is held in a cavity provided centrally in the guide plate 23.

FIG. 3 shows the other half 14 of the two halves 12, 14 arranged in another guide plate 25, The other half 14 has a flange 212, which engages in the recess 112, when the one half 12 of the two halves is placed over the other half 14.

In a subsequent step of this embodiment of the process the one halt 12 is placed over the other half 14 with their edges 16, 16' in an opposing relationship and then the edges 16, 16' of the two halves 12, 14 are pressed, pushed, or forced together, so that the flange or protrusion 212 engages in the recess 112 in a form-fitting connection, i.e., so that the edges 16, 16' of the two halves 12, 14 mate with each other or are in a mating relationship with each other. In the embodiment shown in the drawing this may be accomplished by assembling the other guide plate 25 holding the half 14 together with the guide plate 23 holding the half 12 by sliding the guide rods 312 into the guiding holes 314 shown in FIGS. 2 and 3.

In this embodiment of the process after the mating edges 16, 16' of the two halves 12, 14 are put in a form-fitting connection with each other they are fused or melted by heating so that the edges 16, 16' of the two halves 12, 14 are securely bonded to each other to form the hollow product, which is the deformable ball CB.

In alternative embodiments of the process an adhesive may be applied to the edges 16, 16' of at least one of the edges 16 or 16' prior to putting the halves together, so that the mating edges 16, 16' are bonded together when the halves 12, 14 are assembled with their edges engaged with each other to form the hollow product, namely the ball GB. In one embodiment the adhesive may be a Cyanoacrylate based adhesive preferably Ethyl-2-cyanoacrylate and blends thereof with Poly(methyl methacrylate) (PMMA). The Ethyl-2-cyanoacrylate blends with Poly(methyl methacrylate) (PMMA) are preferably about 85% to 98% by weight Ethyl-2-cyanoacrylate with about 2 to 15% by weight Poly (methyl methacrylate) (PMMA). More preferably the adhesive is 90-95% by weight Ethyl-2-cyanoacrylate and 5-10% by weight Poly(methy methacrylate) (PMMA). In another embodiment, the adhesive may be composed of a blend of 60% or more natural rubber and Neoprene. A preferred composition of the adhesive may be 70% or more natural rubber and Neoprene and the rest of the composition may be gasoline fillers. In another embodiment of the adhesive, it may simply be a product named Cyanoacrylate Adhesive Lem Super, which is available from Zhejiang Golden Roc Chemical Ca, LTD, and which is an ethyl-2-cyanoacrylate having the molecular formula $C_6H_7NO_2$.

The metal core 32 must be removed after bonding the respective halves 12, 14 together at their mating edges 16, 16' to form the ball CB by pulling the core 32 out of the finished deformable product through an opening in the product after the members have been fused together.

The halves 12, 14 may be molded from an elastomeric material, a thermoplastic material, rubber, a blend of rubbers, or a thermoplastic elastomeric material in a molding machine or apparatus. Such machines or apparatus are known and are marketed via the Internet. In some embodiments of the process the hemispheric halves or parts 12, 14 would be made by molding, e.g. injection molding. The cavity of the mold would be shaped or conformed to provide the desired shape and dimensions of the halves 12, 14 by methods that are well known to those skilled in the art of molding thermoplastic or elastomeric materials to form articles of various shapes. The mold would also be configured to provide the openings 19 and polar holes 119 in the ball.

One embodiment of the ball CB, which is made by the process and shown in FIGS. 4-7, has a body W provided with twenty-tour openings 19, The openings 19 in the embodiment shown in FIGS. 4 to 7 are arranged in eight groups G with three openings 19 in each group. The eight groups G are arranged equally spaced around the circumference of the ball CB in the embodiment shown in FIGS. 4 and 5. The three openings 19 in each group G are arranged in a row extending longitudinally between the opposite sides or ends of the ball CB. In addition, polar holes 119 are provided at opposite sides or ends of the ball CB in the embodiment shown in FIGS. 4 to 7, which may also include a spherical sector 119S that may mate with a corresponding recess 119R and lip 119L for improved mating/retention.

The two halves 12, 14 are shown prior to bonding the mating edges 16' with each other in FIGS. 6 and 7. The half 12 with the recess 112 in the edge 16 is shown in FIG. 6 and the half 14 with the flange 212 in the edge 16' is shown in FIG. 7.

Various embodiments of the ball may have a hollow interior space of any of a variety of sizes so that the body of the ball may have any of a variety of different thicknesses. In addition, the shape of the "ball" need not be perfectly spherical, but might have a shape similar to a football or other type of ball in other embodiments of the invention. Furthermore the hemispherical parts or halves may have openings 19, as shown in FIGS. 1, 3, and 4 to 7, which make the product made by the process, in this case of a ball, easier to squeeze, deform or compress. In addition the product may have polar holes of various sizes in different embodiments.

In alternative embodiments the two halves may engage with each other by structural means that differ from the flange or protrusion on the edge of one of the two halves and the recess provided in the edge of the other of the two halves prior to being securely attached with an adhesive or by fusion. For example, a bayonet coupling or snap-in connection is conceivable.

Figure 10C:
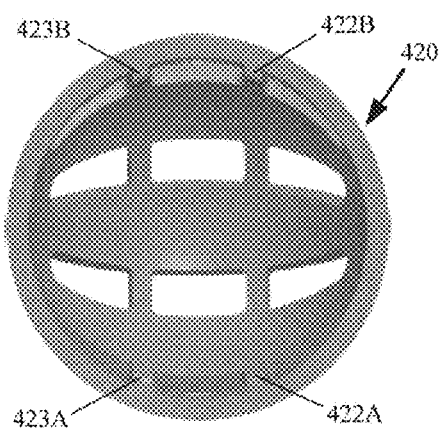
FIG. 10C is a top view of the ball half of FIG. 10A.
Figure 10A:
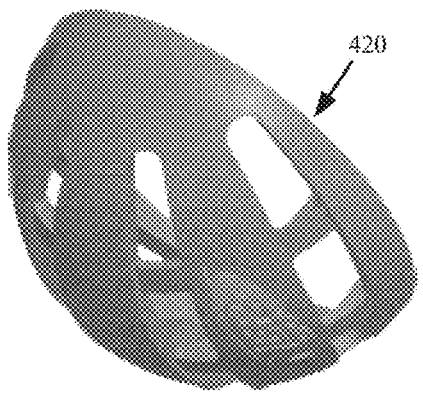
FIG. 10A is a perspective view of a second ball half for yet another embodiment of a molded ball assembly of the present invention.
Figure 10B:
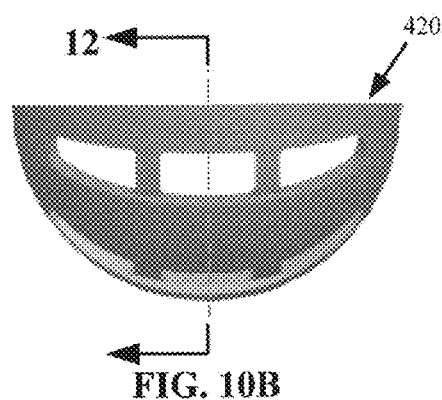
FIG. 10B is a front view of the ball half of FIG. 10A.
Figure 10D:
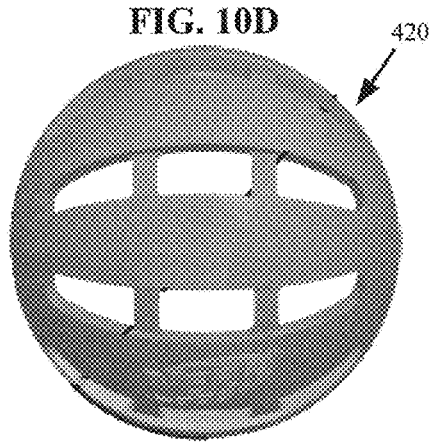
FIG. 10D is a bottom view of the ball half of FIG. 10A.
Figure 10E:
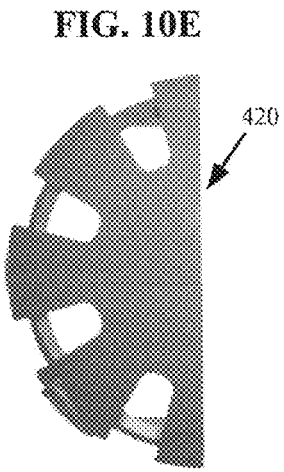
FIG. 10E is a side view of the ball half of FIG. 10A.
Figure 14:
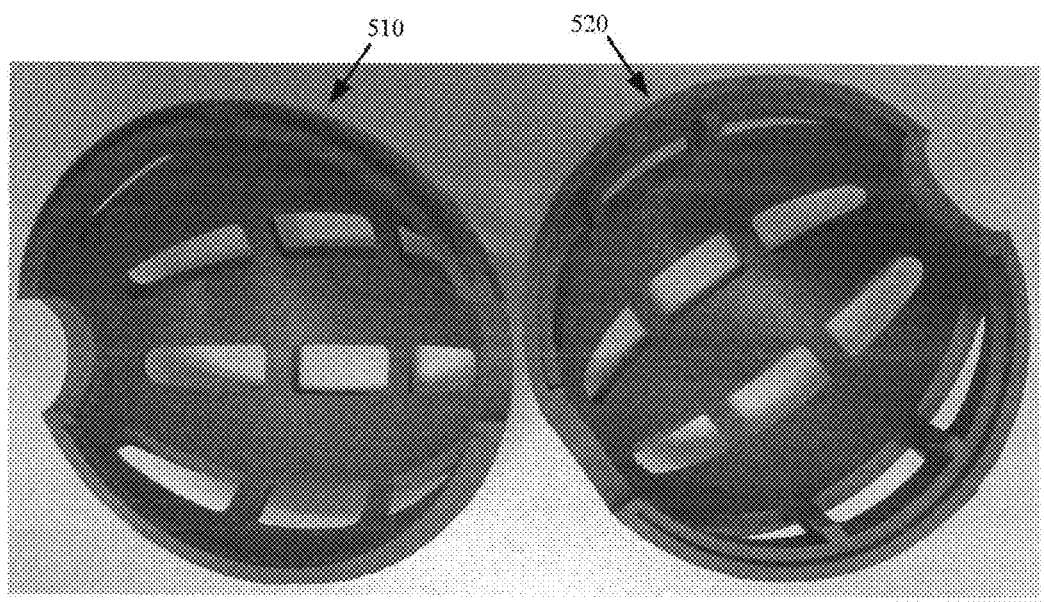
FIG. 14 shows a first and second ball half of yet another embodiment, which is formed similar to the ball halves of FIGS. 9A-9E and FIGS. 10A-10E, but each has poles holes rather than an interlocking key and keyway.

An alternative embodiment is shown by a ball 400 in FIG. 13, acing formed using the two ball halves illustrated in FIG. 11 and FIG. 12. The first ball half 410 is shown in detail in FIGS. 9A-9E, and the second half ball 420 is shown in detail in FIGS. 10A-10E. Each of the ball halves 410, 420 may induce at east one opening 409, and together they may have a total of twenty-four openings (twelve openings for each half), as described above for ball 10. However, ball halves 410 and 420 may utilize a different arrangement for mating of the halves. Ball half 420 may have an arcuate recess, but rather than being formed entirely on the flat mating surface at the illustrated split line 400X (which is actually a plane in three-dimensional space, but is referred to hereinafter simply as the "split line") to be substantially centered thereat, a recess 421 may instead be formed upon the inner half of the mating surface to create an inward facing step 421S. For ball half 410, rather than forming a protrusion that may be centered upon the mating surface, a protrusion 411 may instead be formed upon the inner half of the mating surface (as observed in the cross-sectional view), which protrusion may extend beyond the split line 400X to create an outward facing step 411S. The outward facing step 411S of the ball half 410 may be engaged within the inward facing step 421S of ball half 420, as seen in FIG. 13. To further improve upon the joining of the two halves, the ball half 410 may be formed with a rectangularly-shaped keyway opening 410W, which may be engaged by a corresponding rectangular-shaped "key" (i.e., a protrusion) 420K formed on ball half 420, as seen in FIGS. 11 and 12. The strength of the joining may be aided by the use of a pair of flanges 422A/422B on the ball halt 420, as seen in FIG. 12, the ends of which may serve to locally trap the protrusion 411 of ball half 420, between those ends and the inward facing step 421 of ball half 420 (FIG. 13). Two pairs of flanges (e.g., 422A/422B, and 423A/4238) may be used on the ball half 420, as seen in FIG. 10C. The flanges 422A/422B may be planar, and may be oriented to be substantially perpendicular to the plane formed at the split line 400X. The end of the flanges may terminate in a cylindrical pin, as seen for ball half 520 in FIG. 11, which pin ends may be used for the trapping of the protrusion 411 of ball half 520, which may mate with ball halt 510, also shown therein.

As part of the method of forming the ball, since it is made of rubber, it has to trimmed. Traditionally the trimming had been done by hand, but labor costs have become too expensive. More cost-effective results can now be obtained using a tumbler machine that is available from, for example, the Guangzhou RuiMei Rubber & Plastic Machinery Development Co. it uses a low temperature environment and adds pellets that clean the rubber edges as the tumbler agitates the pellets. To prevent the process from adversely affecting the toys, the product (e.g., the ball halves) may be cured for 24 to 72 hours (preferably 48 hours) before they are processed by the machine. (Note—this curing time is not needed for when the ball halves are trimmed by hand). The process involves Nitrofreeze deburring of the parts for the removal of burrs created during machining and/or other operations performed on plastic, rubber and even metal parts. The deburring does not affect the surface finish or geometry of the part. The deburring tool provides a safe, clean and cost effective alternative to traditional hand, vibratory or tumbling methods. The parts to be deburred are placed in a chamber, cooled and impacted with polycarbonate media.

The machine burrs are frozen and removed quickly and cleanly by the passing, non-abrasive polycarbonate media. Little, to no dust car residue remains. Only the offensive burrs are removed. The edges are maintained without rounding or other material removal occurring.

While the invention has seen illustrated and described as embodied in a process of making hollow products, especially toys or pet products, e.g., a deform be ball, it is not intended to be limited to the details shown, since understandably various modifications and changes may be lade without departing in any way from the spirit of the present invention.

What is claimed is:

1. A deformable ball comprising:
   a first hemispherical portion having a spherical outer surface and a spherical inner surface, with at least one opening interconnected therebetween, and a substantially flat mating surface, said substantially flat mating surface comprising an arcuate recess configured to form an inward facing step;
   a second hemispherical portion having a spherical outer surface and a spherical inner surface, with at least one opening interconnected therebetween, and a substantially flat mating surface, said substantially flat mating surface comprising an arcuate protrusion protruding therefrom being configured to form an outward facing step;
   wherein said inward facing step of said first hemispherical portion is configured to be engaged by, and be secured to, said outward facing step formed by said arcuate protrusion of said second hemispherical portion, in a form fitting relation; and
   wherein said first hemispherical portion comprises a first flange and a second flange, each configured to be substantially perpendicular to a plane formed at a split line between said first hemispherical portion and said second hemispherical portion and to protrude inwardly toward a central portion of said ball, and to enage said arcuate protrusion of said second hemispherical portion on an opposite side as said engagement of said arcuate protrusion with said inward facing step of said first hemispherical portion.

2. The deformable ball according to claim 1, wherein said inward facing step of said first hemispherical portion is secured to said outward facing step of said second hemispherical portion using adhesive.

3. The deformable ball according to claim 1, wherein said inward facing step of said first hemispherical portion is secured to said outward facing step of said second hemispherical portion by being melted at a mating surface.

4. The deformable ball according to claim 1,
   wherein said first hemispherical portion comprises a rectangular-shaped keyway; and
   wherein said second hemispherical portion comprises a protrusion correspondingly shaped to be received by said rectangular-shaped keyway of said first hemispherical portion.

5. The deformable ball according to claim 1, wherein an end of each of said first and second flanges terminates in a cylindrical pin.

* * * * *